Figure 1:
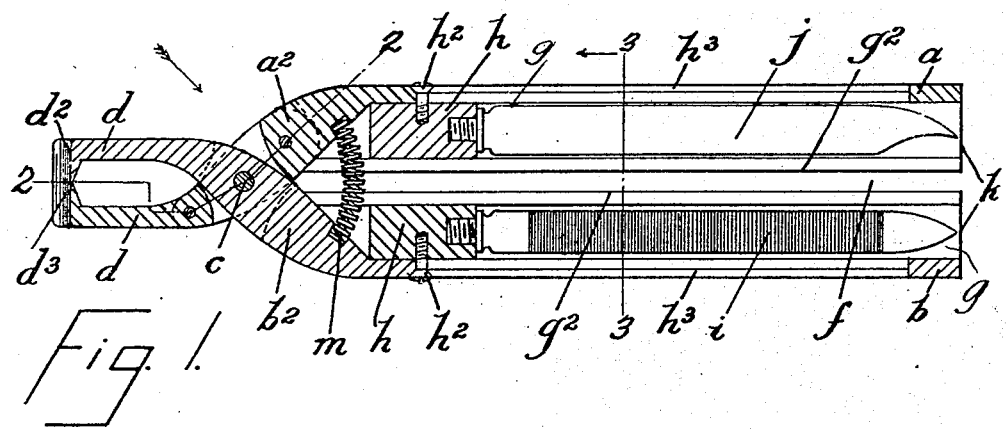

No. 810,402. PATENTED JAN. 23, 1906.
A. H. FRIESE.
NAIL CLIPPER.
APPLICATION FILED JAN. 30, 1905.

WITNESSES
J. C. Larsen
F. A. Stewart

INVENTOR
Adolph H. Friese
BY
Edgar Tate
ATTORNEYS

UNITED STATES PATENT OFFICE.

ADOLPH H. FRIESE, OF NEW YORK, N. Y.

NAIL-CLIPPER.

No. 810,402. Specification of Letters Patent. Patented Jan. 23, 1906.

Application filed January 30, 1905. Serial No. 243,219.

*To all whom it may concern:*

Be it known that I, ADOLPH H. FRIESE, a citizen of the United States, residing at New York, in the county of New York and State of New York, have invented certain new and useful Improvements in Nail-Clippers, of which the following is a specification, such as will enable those skilled in the art to which it appertains to make and use the same.

This invention relates to devices for clipping finger-nails, toe-nails, and the like; and the object thereof is to provide a device of this class which is simple in construction and operation and which may also be used for various other purposes.

The invention is fully disclosed in the following specification, of which the accompanying drawings form a part, in which the separate parts of my improvement are designated by suitable reference characters in each of the views, and in which—

Figure 2:
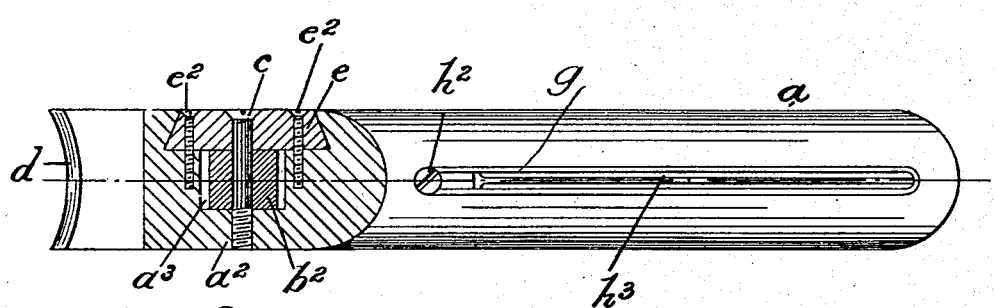
Figure 3:
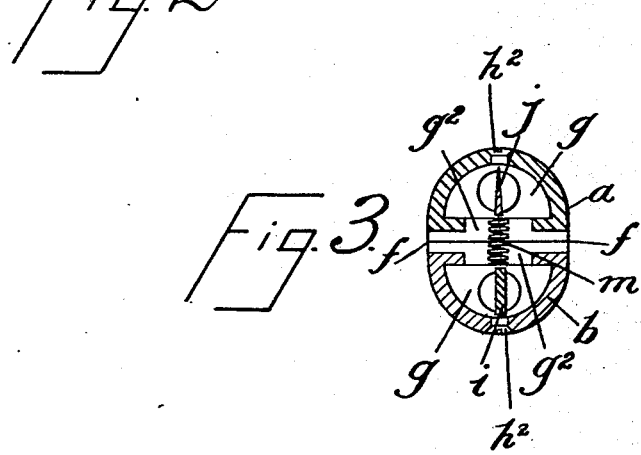

Figure 1 is a sectional side view of my improved nail-clipper; Fig. 2, a section on the line 2 2 of Fig. 1, and Fig. 3 a section on the line 3 3 of Fig. 1.

In the practice of my invention I provide a nail-clipper which comprises two handle members $a$ and $b$, having shanks $a^2$ and $b^2$, which are curved at an angle of about forty-five degrees to the handle members and which are pivoted together at $c$ in the manner of a pair of shears and each of which is provided with a projecting jaw $d$, said jaws being segmental in form, as shown at $d^2$, and provided with inwardly-directed cutting edges $d^3$.

In connecting the shanks $a^2$ and $b^2$ of the handle members $a$ and $b$ I form in one of said shanks a transverse recess $a^3$, through which the other shank passes, and in the form of construction shown the recess $a^3$ is formed in the shank $a^2$, and the shank $b^2$ is reduced in form and passes through said recess and is held therein by a transverse plate $e$, which is secured to the shank $a^2$ by screws or bolts $e^2$.

The handle members $a$ and $b$ are semicylindrical in cross-section and are separated by a longitudinal slot $f$, and each of said handle members is provided with a longitudinal central space $g$, and the inner faces of said handle members are provided with a longitudinal slot or opening $g^2$, and placed in each of the longitudinal spaces $g$ is a slide $h$, each of which is provided with a headed screw, pin, or bolt $h^2$, and said headed pins, screws, or bolts $h^2$ pass outwardly through the corresponding slots $h^3$, and the slides $h$ may be moved longitudinally of the handle members by means of said headed pins or bolts. One of the slides $h$ is provided with a nail-file $i$ and the other with a blade $j$, and said blade may be used in the manner of an ordinary knife-blade and the file $i$ in the manner of ordinary devices of this class, and either said file or said blade may be projected through the end $k$ of the handle members $a$ and $b$ by simply moving the slides $h$ outwardly, as will be readily understood, and when desired or necessary they may be withdrawn into the handle members by moving said slides inwardly.

Between the separate handle members or between the shanks $a^2$ and $b^2$ thereof is placed a spring $m$, which normally serves to separate said handle members and to open the jaws $d$, and the operation of this device in clipping or trimming nails will be the same as that of other devices of this class.

It will thus be seen that I provide a combination tool or implement which may be used as a nail-clipper, as a nail-file, and is also provided with a knife-blade which may be used for various purposes.

Having fully described my invention, what I claim as new, and desire to secure by Letters Patent, is—

1. A device of the class described, comprising two handle members having shanks at one end which are pivoted together in the manner of a pair of shears, said shanks being provided with projecting jaws having inwardly-directed cutting edges, said handle members being also provided with longitudinal spaces which open outwardly and with slides which are mounted therein and provided with different tools, substantially as shown and described.

2. A device of the class described, comprising two handle members having curved shanks at one end pivoted together in the manner of a pair of shears, said shanks being provided with projecting jaws having inwardly-directed cutting edges, said handle members being also provided with longitudinal chambers which open outwardly and tool-slides mounted therein, said handle members being also provided with longitudinal slots, and devices passing through said slots and connected with said slides, substantially as shown and described.

In testimony that I claim the foregoing as my invention I have signed my name, in presence of the subscribing witnesses, this 28th day of January, 1905.

ADOLPH H. FRIESE.

Witnesses:
F. A. STEWART,
C. J. KLEIN.